United States Patent Office.

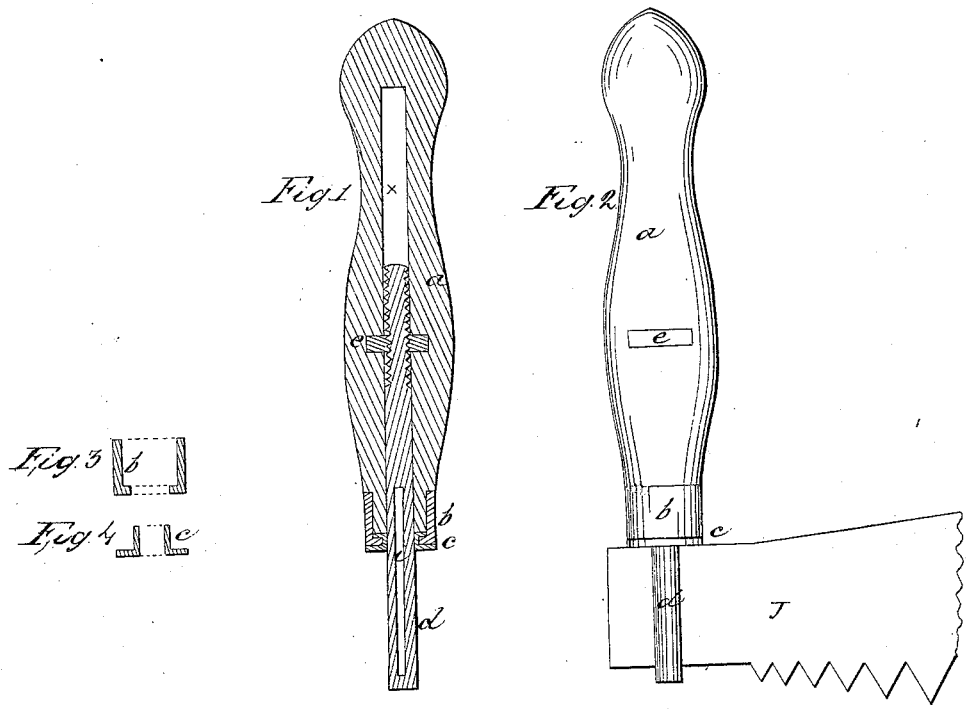
P. Donoughe,
Saw Handle.
№ 78,653.    Patented June 9, 1868.

PATRICK DONOUGHE, OF LORETTO, PENNSYLVANIA.

*Letters Patent No. 78,653, dated June 9, 1868; antedated May 19, 1868.*

IMPROVEMENT IN MODE OF ATTACHING HANDLES TO CROSS-CUT SAWS.

*The Schedule referred to in these Letters Patent and making part of the same.*

TO ALL WHOM IT MAY CONCERN:

Be it known that I, PATRICK DONOUGHE, of Loretto, in the county of Cambria, and State of Pennsylvania, have invented a certain new and useful Improvement in Handles for Saws; and I do hereby declare that the following is a full and exact description thereof, reference being had to the accompanying drawings, and letters of reference marked thereon.

The nature of my invention consists in the combination and arrangement of a handle, ferrule, washer, screw-nut, and a shank furnished with an opening for the saw-blade; the whole being constructed, arranged, and operating in the manner hereinafter described.

To enable others skilled in the art to make and use my invention, I will proceed to describe its construction and operation.

In the accompanying drawings—

Figure 1 represents a longitudinal section of my improvement in saw-handles.

Figure 2 represents the handle secured to its place on the saw-blade.

Figure 3 represents a sectional view of the ferrule of the handle.

Figure 4 represents a sectional view of the washer prior to its being secured to its place in the ferrule.

In the drawings, $a$ represents the handle; $b$ represents the ferrule; $c$ represents the washer; $d$ represents the shank of the handle $a$, and is furnished with an opening, marked $i$, for receiving the saw-blade, marked $J$; $e$ represents a screw-nut, which is embedded in the handle $a$. The washer $c$ is placed in the ferrule $b$, and is set or bent down on the flange of the ferrule, as represented in fig. 1, but arranged so that it will turn in the ferrule with ease. The upper end of the shank $d$ is furnished with screw-threads, so that it can be raised or lowered down in the opening $x$ of the handle, so as to adapt the handle $a$ and its shank $d$ to suit saws of different width. The washer is used for the purpose of allowing the handle $a$ to turn with ease when securing it on the saw. The screw-nut $e$ should be secured in the handle $a$, in a permanent manner, with its opening for the shank $d$ placed central to the opening $x$ of the handle $a$.

The construction and operation of my improved saw-handle will be readily understood by the skillful mechanic by reference to the drawings.

Having thus described the nature, construction, and operation of my improvement, what I claim as of my invention, is—

The arrangement of the handle $a$, ferrule $b$, washer $c$, rod $d$, and nut $e$, the whole being constructed, arranged, and operating substantially as herein described, and for the purpose set forth.

P. DONOUGHE.

Witnesses:
 JAMES J. JOHNSTON,
 ALEXANDER HAYS.